United States Patent [19]

Kosman

[11] Patent Number: 4,610,616

[45] Date of Patent: Sep. 9, 1986

[54] BRICK MOULDING DEVICE

[75] Inventor: Wilhelmus J. M. Kosman, Groesbeek, Netherlands

[73] Assignee: 501 Machinefabriek de Boer B.V., Nijmegen, Netherlands

[21] Appl. No.: 550,037

[22] Filed: Nov. 8, 1983

[30] Foreign Application Priority Data

Nov. 25, 1982 [NL] Netherlands ........................ 8204597

[51] Int. Cl.$^4$ ............................................... B29C 39/24

[52] U.S. Cl. ....................................... 425/99; 198/409; 414/762; 414/773; 425/413

[58] Field of Search ................. 425/259, 112, 439, 99, 425/453, 125; 198/409, 406; 414/758, 773, 778, 779, 783, 784, 761, 762

[56] References Cited

U.S. PATENT DOCUMENTS 4,050,574 9/1977 Chenevard et al. ................ 198/408

4,378,202 3/1983 Kosman ............................. 425/112

4,502,588 3/1985 Whiteside et al. ................. 198/409

FOREIGN PATENT DOCUMENTS 39982 11/1981 European Pat. Off. .

*Primary Examiner*—Jay H. Woo

*Assistant Examiner*—J. Fortenberry

*Attorney, Agent, or Firm*—John P. Snyder

[57] ABSTRACT

A device for moulding brick blanks comprises a plurality of moulding troughs and a casting device for filling the moulding troughs, wherein the casting device comprises a carrier coupled with a casting mechanism and adapted to pivot by means of the casting mechanism between a receiving position and a delivery position. For mitigating or avoiding the drawbacks of the heavy shocks at the impact of the casting mechanism in the delivery position the casting mechanism is caused to drive and guide the carrier in a manner such that when approaching the delivery position the carrier is subjected to considerable deceleration.

12 Claims, 7 Drawing Figures

BRICK MOULDING DEVICE

Figure 1:
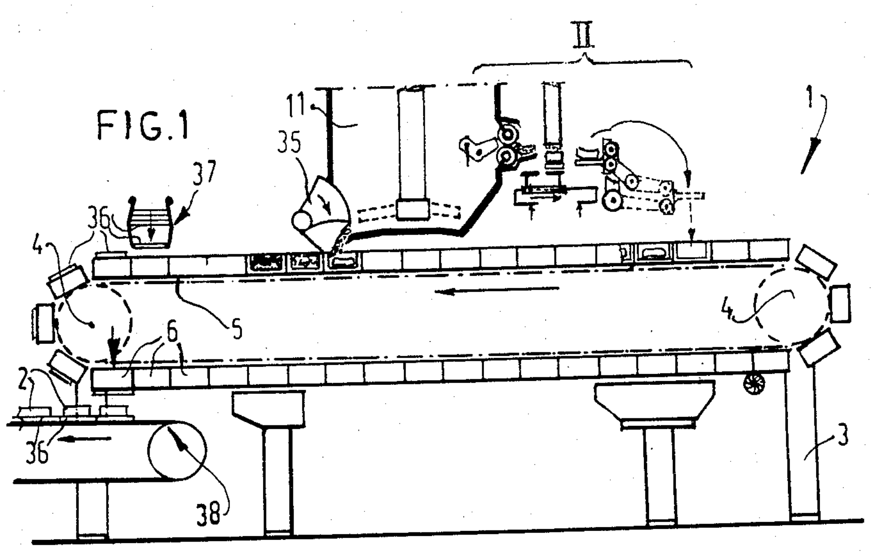

The invention relates to a device for moulding brick blanks comprising a plurality of moulding troughs and a casting device for filling the moulding troughs, said casting device comprising at least one carrier coupled with a casting mechanism and adapted to pivot by means of the casting mechanism between a receiving position and a delivery position.

Such a device is known. Herein the carrier receives in its receiving position a slice of material, for example, clay which may be sprinkled, for example, with sand. During the turn of the carrier to the delivery position the carrier holding the slice is turned upside down and in the delivery position the turned-over slice is delivered by an element of the casting mechanism striking an abutment. In the known devices of the kind set forth this abutment is formed by an expensive, hydraulic damper, whose lifetime is short due to the heavy shocks to be frequently absorbed.

The casting mechanism of the known device comprises a parallelogram rod system, one of the four rods being a driven crank turned reciprocatorily through 90°, whilst the carrier is fastened to a rod, which has to turn through 180° and which performs for this purpose a free relative movement with respect to the driven rod. As a result the accelerations and decelerations of the carrier cannot be satisfactorily controlled so that the carrier cannot be prevented with certainty from losing the slice prematurely. In the known device the driven rod is coupled with a pneumatic ram set for reciprocating the carrier.

The invention has in the first place for its object to mitigate or to avoid the drawbacks of the heavy shocks at the impact of the casting mechanism in the delivery position by causing the casting mechanism to drive and guide the carrier in a manner such that when approaching the delivery position the carrier is subjected to a considerably deceleration.

Thanks to the drastic deceleration of the carrier inherent in the casting mechanism chosen a simpler damper operating as a stop will suffice and/or the lifetime of the damper is appreciably prolonged. By correctly proportioning the casting mechanism the abutment may even be fully dispensed with. This means by the omission of a damper a considerable saving and, in addition, a prolongation of the lifetime of the casting mechanism because it is subjected to a considerably lesser extent to shocks.

When the carrier is guided by mean of two guiding arms each being pivotable on the one hand about fixed axes with respect to a frame and on the other hand about pivotal axes with respect to the carrier, the carrier is prevented from disengaging the slice prematurely during its pivotal movement.

The casting mechanism is preferably driven by an electric brake motor.

The aforesaid and further features of the invention will be described more fully hereinafter with reference to a drawing.

The drawing schematically shows in

Figure 2:
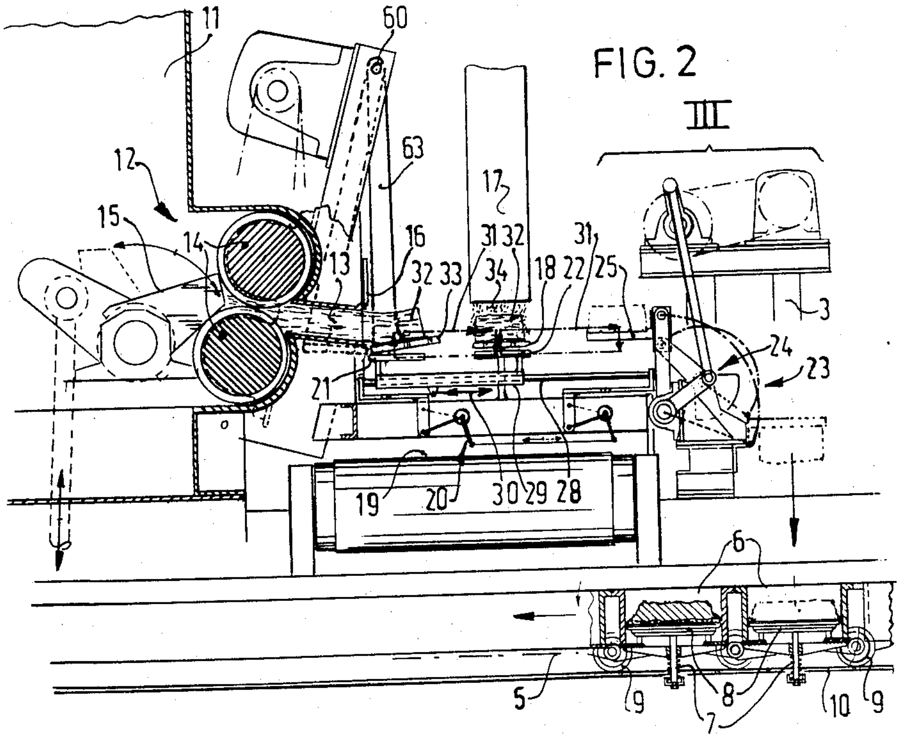
Figure 3:
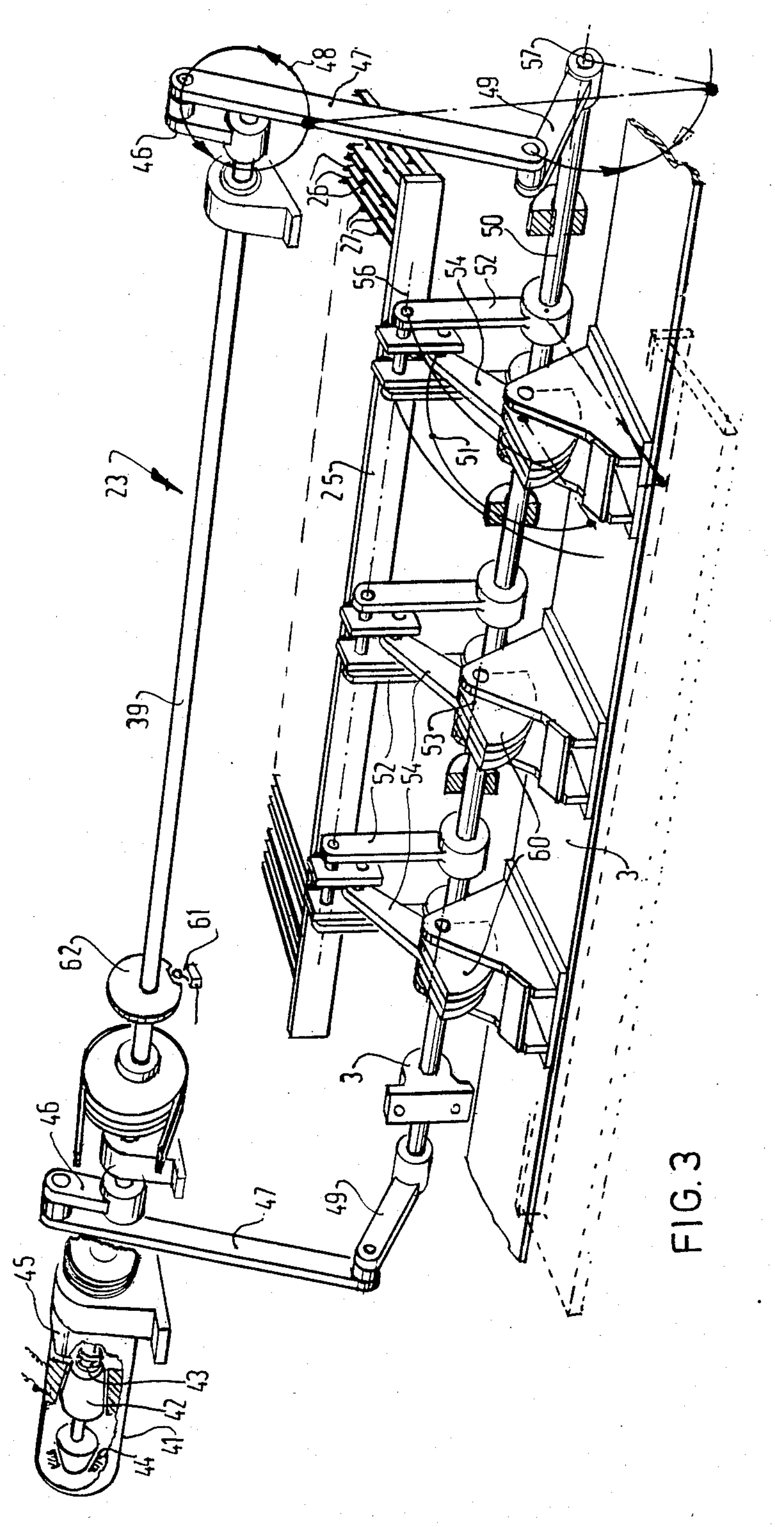
Figure 4:
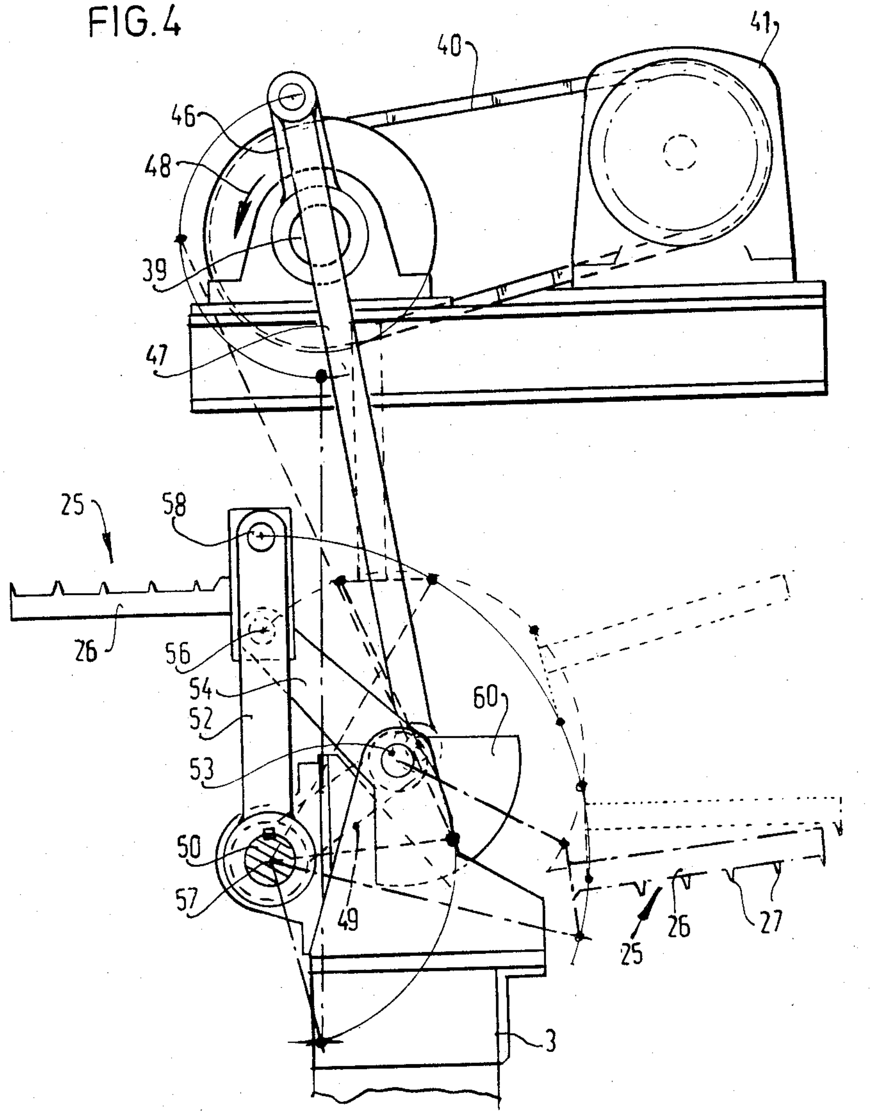
Figure 5:
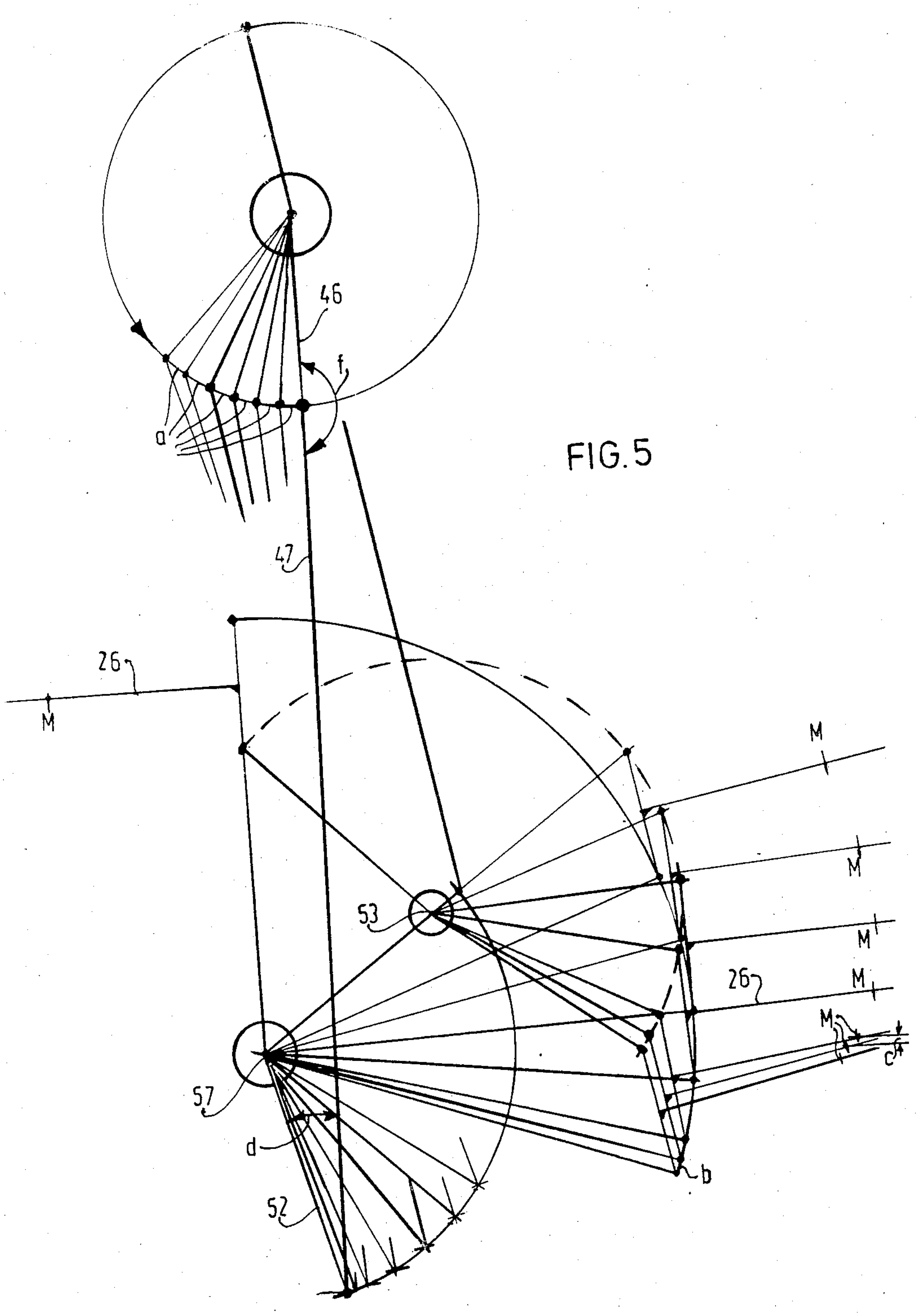
Figure 6:
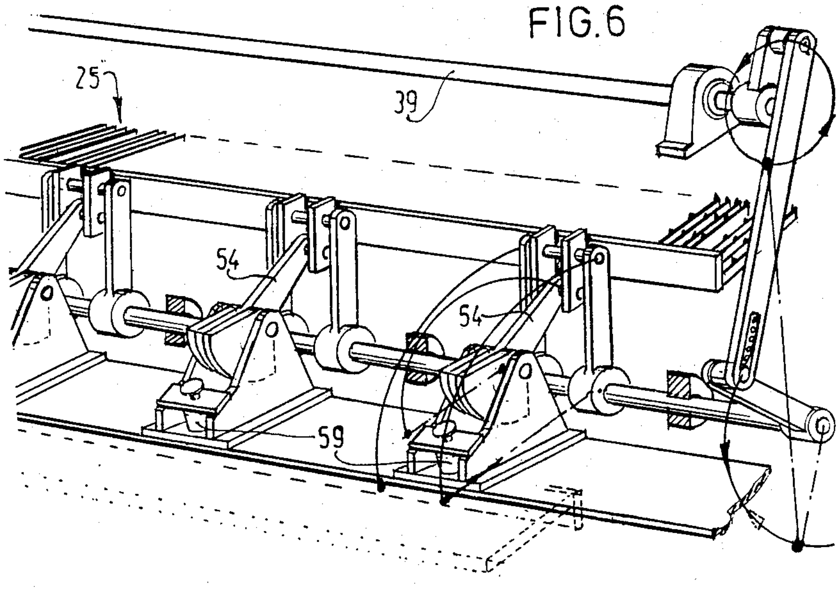
Figure 7:
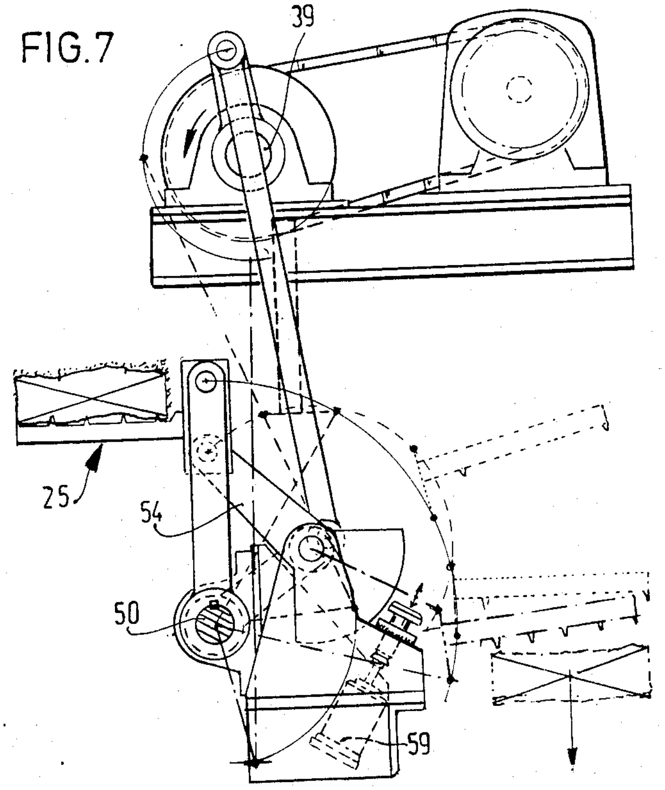

FIG. 1 a side elevation of a device for moulding bricks in accordance with the invention, FIG. 2 on an enlarged scale detail II of FIG. 1, FIG. 3 an enlarged, perspective view of detail III of FIG. 2, FIG. 4 an enlarged side elevation of detail III of FIG. 2, FIG. 5 on a further enlarged scale a further schematic view of detail III of FIG. 2 and FIGS. 6 and 7 elevational views corresponding to FIGS. 3 and 4 of a further device embodying the invention.

The device 1 for moulding blanks 2 is mounted on a frame 3, in which two rotors 4 are rotatably journalled for stepwise intermittently driving and guiding an endless chain conveyor 5. The chain conveyor 5 carries a plurality of endless sequences of moulding troughs 6, having bottoms 8 pushed outwards by springs 7 and being guided by means of guide rollers 9 along rails 10. The device furthermore comprises a clay reservoir 11, whose delivery means 12 for conducting away a strand of clay 13 consist of two rollers 14 and a reciprocatorily pivoting pressing member 15. The device furthermore comprises a slice cutter 16, a sprinkler 17 with a fixed sprinkling grating 18 and a conveyor 19 collecting the sprinkled material, a slice conveyor 20 comprising two transport gratings 21 and 22 and a casting device 23 comprising a carrier 25.

The carrier 25 has the shape of a comb having teeth formed by a sequence of grating rods 26 provided on the carrying side with extensions 27. The carrier 25 is coupled with a casting mechanism 24, which periodically reciprocates the carrier 25 between a receiving position indicated by solid lines in FIG. 2 and a delivery position indicated by broken lines in FIG. 2.

The device 1 is operating stepwise and its elements are periodically operating at each processing station with the frequency of the stepwise movement of the chain conveyor 5. Thus a slice conveyor support 28 is moved up and down and a slide 29 is guided with respect to the support 28 and reciprocated in the direction of the arrow 30 so that the gratings 21 and 22 carried by the slide 29 pass along the circulation tracks 31, the grating 21 picking the cut slices 32 from a comb grating 33 and depositing it on the fixed sprinkling grating 18. The comb grating 33 pivots intermittently about a shaft 60 by means of pivoting arms 63. The sand 34 falling from the sprinkler 17 drops partly on the slices 32 and partly on the sand collecting member 19. The sprinkled slices 32 are taken by the transport grating 22 from the sprinkling grating 18 and deposited on the carrier 25 being in its receiving position. The casting device 23 casts these slices 32 into the moulding troughs 6. By means of a pressing mechanism 35 the moulding troughs 6 are filled up and pressed to form the brick blanks 2. From a store 37 drying plates 36 are deposited on the moulding troughs 6. Then the drying plates 36 with the brick blanks 2 carried thereby are brought to a reversing place of the endless conveyor 5 onto a conveyor 38 and transported to a drying furnace.

The carrier 25 of the casting device 23 of FIG. 3, as a common carrier of a plurality of clay slices 32, has a large width and comprises, distributed along its length, a plurality of elements of the casting mechanism 24. The casting device 23 is driven from both sides of the device 1 by a common shaft 39, which is driven through a rope drive 40 and a reduction transmission 45, for example, by a periodically energized brake motor 41, the rotor 42 of which, when energized, is discoupled against spring action of a spring 43 from a brake 44 and is brought into engagement with the brake 44 immediately upon de-energization by said spring 43 so that the drive of the casting device 23 is stopped.

The de-energization is actuated by a sensor switch 61 responding to a cam disc 62 of the shaft 39. Driving cranks 46 connected with the shaft 39 and rotating in the direction of the arrow 48 cause a shaft 50 to rotate reciprocatorily about a fixed axis 57 via connecting rods 47 and driven cranks 49 and hence causing guiding arms 52 connected with the shaft 50 to pivot to and fro in the direction of the arrows 51. Guiding arms 54 pivotable about fixed axes 53 with respect to frame 3 and journalled in consoles are connected with the carrier 25 so as to be pivotable about the pivotal axis 56. The guiding arms 52 pivotally engage the carrier 25 in the pivotal axis 58. The pivotal axes 56 and 58 and the fixed axes 53 and 57 are parallel to one another.

The relative positions of the fixed axes 53 and 57 and the pivotal axes 56 and 58 and the length of the guiding arms 52 and 54 are shown in proportion in FIG. 4 and are chosen so that the casting mechanism 24 can drive and guide the carrier 25 in a manner such that during its approach of the delivery position the carrier 25 is subjected to a considerable, preferably, drastic, deceleration. This is illustrated in FIG. 5 in which with equal arc distances a covered by the crank 46 during the approach of the delivery position the pivotal axis 58 covers a gradually smaller arc distance b. Likewise the centre m of the grating rods 26 then covers an abruptly reduced distance c, which is indicative of the then occurring drastic deceleration, as a result of which the clay slices 32 are ejected from the carrier 25. This is a result of the fact that the angle of shear d between the crank 49 and the connecting rod 47 is then small. An angle of shear d even smaller than that shown enhances the deceleration. The angle of shear (f) between the crank 46 and the connecting rod 47 is then about 180° at the lower so-called dead point. Abutment between the carrier 25 on the one hand and the frame 3 on the other is now no longer absolutely necessary. If desired, dampers 59 may be used as is shown in the variant of FIGS. 6 and 7. However as shown in FIGS. 1 to 5 the casting mechanism 24 preferably performs a continuous movement without jolts for moving the carrier 25 towards and away from the delivery position.

Counterweights 60 ensure balancing of the casting mechanism 24. It should be noted that the casting mechanism 24 is proportioned so that on its path from the receiving position up to the achievement of its turn-over the carrier 25 is constantly accelerated so that the slices 32 do not yet tend to disengage the carrier 25. Only after the turn-over of the carrier 25 the deceleration sets in. Furthermore the casting mechanism is proportioned so that the grating rods 26 move substantially vertically downwards during the last part of the casting movement and in a substantially horizontal position.

What we claim is:

1. A device for receiving a mass of clay which is to be formed into a brick and for depositing it accurately in a molding tray, which comprises:

a carrier having a supporting surface;

first and second pivot means connected to said carrier in spaced relation to each other;

linkage means for sweeping said first and second pivot means synchronously back and forth along respective first and second arcuate paths and a drive means for oscillating said linkage means so that said first pivot means sweeps said first arcuate path from a first end position at one end of said first arcuate path to a second end position at the other end of said first arcuate path while being decelerated as it approaches said second end position and said second pivot means sweeps said second arcuate path from a first end position at one end of said second arcuate path to a second end position at the other end of said second arcuate path while also being decelerated as it approaches said second end position thereof;

the radii of said first and second paths being such that said supporting surface moves from an upwardly facing position when said first pivot means and said second pivot means are at said first end positions thereof to a downwardly facing position in registry above a molding tray when said first pivot means and said second pivot means are at the second end positions thereof so that as said supporting surface approaches said downwardly facing position in registery above a molding ray, the decelerations of said first and second pivot means separate the mass of clay from said supporting surface and deposit it accurately into the molding tray.

2. A device as defined in claim 1 wherein the radius of said second path is shorter than the radius of said first path.

3. A device as defined in claim 2 wherein said first pivot means is above said second pivot means when such pivot means are in their first end positions thereof and said second pivot means is above said first pivot means when such pivot means are in their second end positions thereof.

4. A device as defined in claim 1 wherein said first pivot means is above said second pivot means when such pivot means are in their first end positions thereof and said second pivot means is above said first pivot means when such pivot means are in their second end positions thereof.

5. A device as defined in claim 4 wherein said first pivot means is vertically above said second pivot means when said first and second pivot means are in said first end positions thereof.

6. A device as defined in claim 3 wherein said first pivot means is vertically above said second pivot means when said first and second pivot means are in said first end positions thereof.

7. A device as defined in claim 1 wherein said drive means includes a drive shaft and means for rotating said drive shaft one complete rotation thereof, and said linkage means including drive linkage means connecting said drive shaft to said first pivot means for driving said first pivot means from said first end position, to said second end position and then back to said first end position in response to said one complete rotation of said drive shaft.

8. A device as defined in claim 2 wherein said second arcuate path crosses said first arcuate path twice so that said supporting surface attains a horizontal, downwardly facing position when said first and second pivot means are between the ends of their arcuate paths and so that the end of said supporting surface remote from said first and second pivot means is being swung upwardly relative to that portion of the supporting surface adjacent said first and second pivot means when said first and second pivot means approach their second end positions.

9. A device as defined in claim 1 wherein the radii of said arcuate paths are dissimilar so that the lengths of said first and second arcuate paths are different.

10. A device as defined in claim 9 wherein the length of said first arcuate path is greater than the length of said second arcuate path.

11. A device for receiving a mass of clay which is to be formed into a brick and for depositing it accurately in a molding tray, which comprises:

a driven shaft defining a first axis and a first arm fixed to said driven shaft and extending radially therefrom, and first pivot means on said first arm in radially spaced relation to said first axis;

an idler shaft defining a second axis disposed in spaced, parallel relation to said first axis and a guide arm fixed to said idler shaft and extending radially therefrom, and second pivot means on said guide arm in radially spaced relation to said second axis;

a carrier having a supporting surface and said first and second pivot means being connected to said carrier in spaced relation to each other; and drive means for driving said driven shaft in oscillatory fashion so that the first pivot means is driven to sweep a first arcuate path from a first end position at one end of said first arcuate path to a second end position at the other end of said first arcuate path while being decelerated as it approaches said second end position, while said second pivot means sweeps a second arcuate path from a first end position at one end of said second arcuate path to a second end position at the other end of the second arcuate path;

the lengths of said first arm and said guide arm, the spacing between said first and second axes, and the spacing between said first and second pivot means on said carrier being such that said supporting surface moves from an upwardly facing position when said first and second pivot means are at said first end positions thereof to a downwardly facing position in registry above a molding tray when said first and second pivot means are in their second end positions thereof and so that as said supporting surface approaches said downwardly facing position in registry above a molding array, the deceleration of said first pivot means separates the mass of clay from said supporting surface and deposits it accurately into the molding tray.

12. A device as defined in claim 11 wherein said drive means includes a drive shaft and means for rotating said drive shaft through one complete revolution, and linkage means connecting said drive shaft to said driven shaft.

* * * * *